Figure 1:
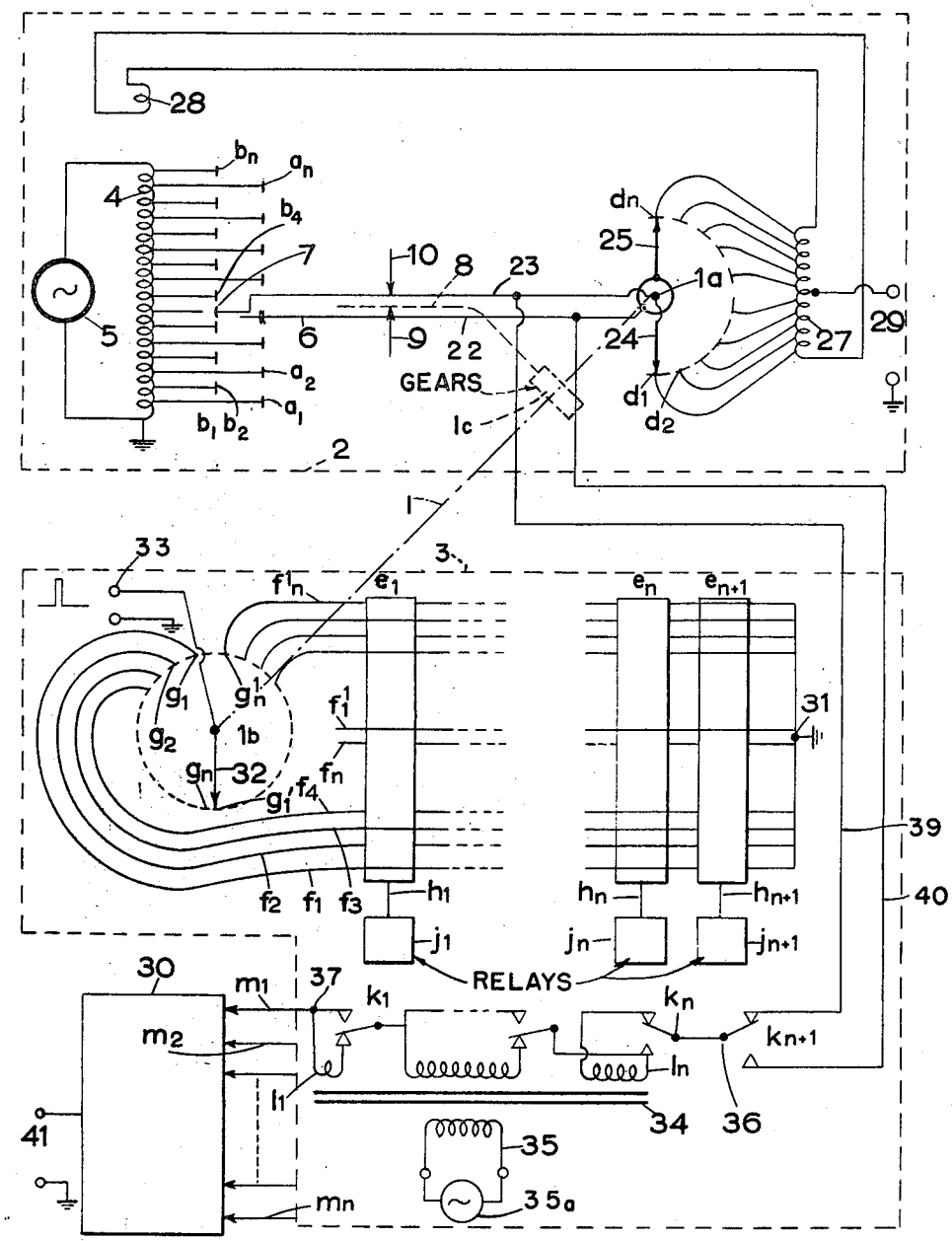

Aug. 16, 1960     R. E. SPENCER     2,949,232
RATE EVALUATING APPARATUS

Filed Aug. 27, 1954     2 Sheets-Sheet 1

INVENTOR
R. E. Spencer
ATTORNEYS

United States Patent Office 2,949,232
Patented Aug. 16, 1960

2,949,232

RATE EVALUATING APPARATUS

Rolf Edmund Spencer, West Ealing, London, England, assignor to Electric & Musical Industries Limited, Hayes, England, a company of Great Britain Filed Aug. 27, 1954, Ser. No. 452,647

Claims priority, application Great Britain Sept. 3, 1953

6 Claims. (Cl. 235—183)

This invention relates to apparatus for evaluating the rate of change of one variable with respect to a second variable.

In the United States patent specification No. 2,887,270 there is described rate evaluating apparatus for evaluating a smoothed rate of change of one variable, say displacement, with respect to a second variable, say time. The displacement, which may be that of a target being tracked by radar or other tracking means, is sampled at successive discrete instants and the sampled values are stored so that they can be used for evaluation over an interval of time. In a practical case the apparatus may require storage facilities for as many as ten different values of a displacement, and the sampling and storing may be effected by apparatus such as described in United States patent specification No. 2,882,524. According to this specification, the sampling and storing apparatus comprises a series of switches, which may be taken as representing a series of binary digits of progressively increasing order and in operation when a sample is taken the switches are set in a combination of states which represent in binary code form the displacement at the instant of sampling. The switches control the number of turns in the secondary winding of a transformer (as described with reference to Figure 2 in the aforesaid specification) and the primary winding of the transformer is energised with a reference alternating voltage so that an alternating voltage can be derived from the secondary winding whose amplitude is the voltage analogue of the displacement at the instant of sampling. The transformer thus, in effect, stores the sampled value of the displacement.

If storage facilities for ten values of the displacement are required, ten different series of switches and ten transformers are required, as well as a considerable amount of other equipment for operating the switches, such as described in the latter specification. Moreover, the displacement may have any value within the full range of the tracking apparatus which may be of the order of 200,000 feet. To cover a range of this order, to a high degree of accuracy, by means of binary code representations, a large number of binary digits, that is a large number of switches and associated apparatus, is required in each storage means. Moreover, assuming that sampling is effected once per second, the information in each store will be required for an interval of the order of 10 seconds, but in this interval the target is unlikely to travel more than a small fraction of the full range of the tracking apparatus and since the stored information is required only for rate evaluation purposes, the storage of each value of displacement in full represents the storage of a considerable amount of redundent information.

It might be thought that considerable saving could be achieved by storing only a representation of the most recent position of the target, and a series of differences indicative of the position of the target at successive past sampling instants. However, such a proposal would require a considerable amount of digital subtraction and moreover the application of the weighting function by means of apparatus of the kind described in the United States patent specification No. 2,887,220 would be rendered more difficult, so that any economy in storage facilities would be largely off-set.

The object of the present invention is to reduce the difficulties indicated in the preceding paragraphs.

According to the present invention there is provided apparatus for evaluating the rate of change of one variable with respect to a second variable comprising means for observing values of the first variable at successive values of the second variable, a plurality of stores for storing a plurality of part-representations of observed values of the first variable, each during a predetermined interval of time corresponding to a predetermined interval of the second variable, each part-representation being a representation of lower order digits of the respective observed values, means responsive to said observing means for selectively modifying the stored part-representations to cause them to differ by the same amounts as the respective observed values of the first variable, and means responsive to the selectively modified part-representations for generating a signal representing the desired rate of change.

To facilitate understanding of the invention, it will be assumed that the apparatus is required to evaluate rate of change of a displacement which may have any value within a range of 200,000 feet. It is assumed that sampling occurs every second and that the apparatus has facilities for storing ten values of the displacement, so that the storage interval for each value is of the order of 10 seconds. A maximum displacement of 12,500 feet is assumed for the target in an interval of 10 seconds and if this displacement is represented by a binary digit in a given digit place, higher order digits representing respectively 25,000, 50,000 and 100,000 feet are necessary in order to represent in full any displacement which may be observed. In accordance with the invention, storage is effected only of the contribution of the lower order digits of each displacement, that is the digits capable of representing displacements of up to 12,500 feet. In effect the full range of the apparatus is divided by boundaries spaced at intervals of 12,500 feet, the values of the displacement which are stored being measured with respect to one of the boundaries. In rate evaluation, the absolute value of the displacement within the full range is unimportant and only the relative differences between successive observations are necessary and since, on the assumption made regarding the maximum travel of the target within the storage interval, any system of ten successive observations of the displacement must fall within the range of 12,500 feet, the rate measurement can be effected in accordance with the invention without ambiguity.

In order to illustrate the invention the following digital values will be assumed

| | Feet |
|---|---|
| .10000 | 100,000 |
| .01000 | 50,000 |
| .00100 | 25,000 |
| .00010 | 12,500 |
| .00001 | 6,250 |
| .000001 | 3,125 | and on the basis of the foregoing description, each displacement is stored by utilising the digital place for 6,250 feet and as many lower order digital places as are required to represent the displacement to the required degree of accuracy. With these digital places displacement up to 12,500 feet can be represented.

A difficulty nevertheless arises. In a series of 10 observations some of the displacements observed may lie on one side of an imaginary boundary and some on the other side of the boundary. For instance if the target is moving in the sense of increasing displacement, some of the earlier displacements observed before the crossing of the boundary may have unit value for the digit of highest order which is stored, whereas later displacements observed after crossing the boundary may have zero value for the highest order digit which is stored. Therefore, derivation of the rate signal using the stored digits only might in some cases lead to error since in general the derivation of the rate signal involves a differencing process. This difficulty is however avoided in accordance with the present invention by the provision of means for representing in succession the values of the first variable (namely displacement in the case discussed) for successive values of the second variable (namely time in the case discussed) and taking the said representation into account in the derivation of the rate signal. In general in the field of use for which the present invention is intended, such means are present as an incidental part of the apparatus in the form of means for indicating the instantaneous position of the target. It will be appreciated that it is readily possible to condition automatically the means for deriving the rate signal to take account of the crossing of boundaries in response to the absolute value of the first variable.

In one practical form of the invention means are provided for adding to each stored signal part at least of the corresponding representation derived from the means for representing in succession successive values of the first variable.

In another practical form of the invention means are provided for adding to each stored signal an additional signal the sign of which is variable in response to the means for representing in succession the successive values of the first variable.

Figure 2:
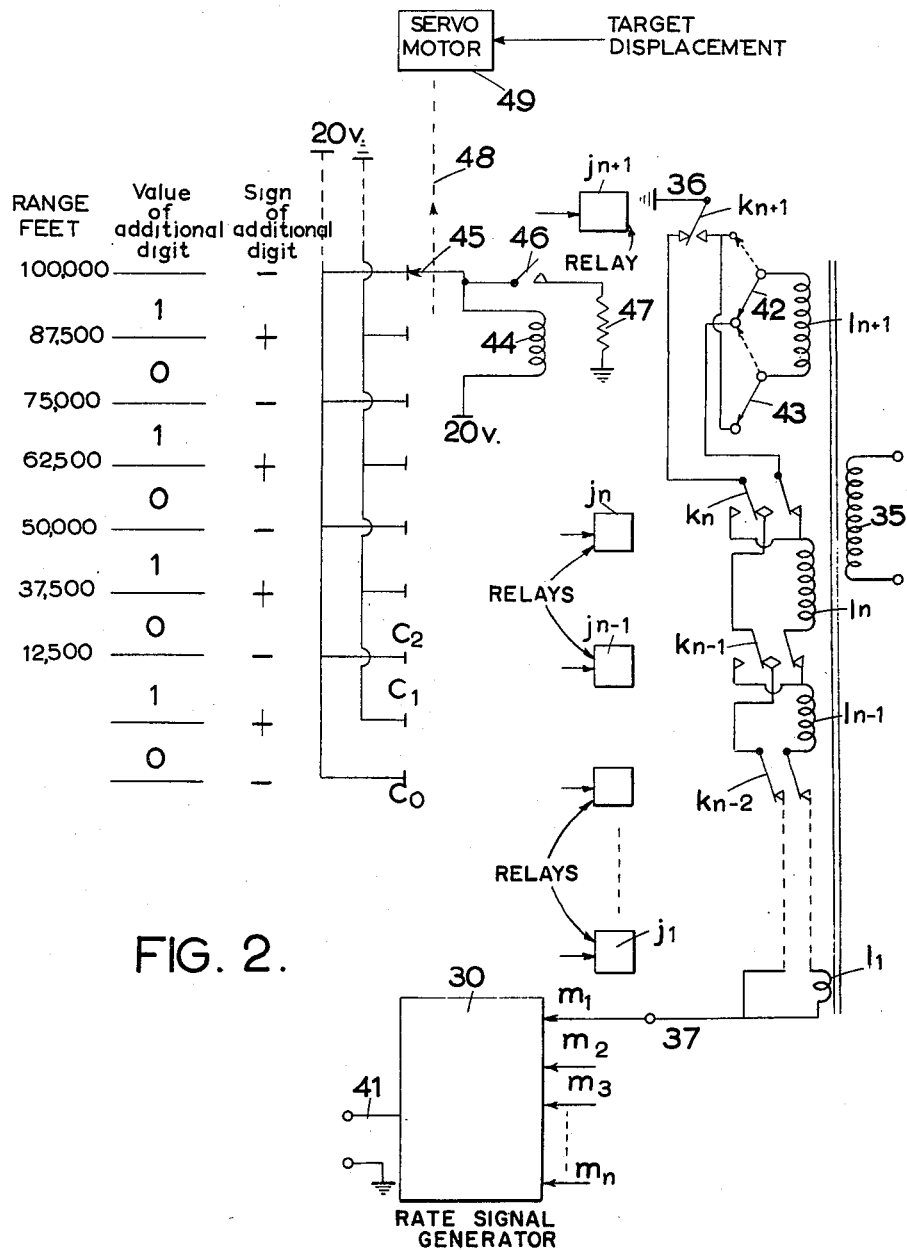

In order that the invention may be clearly understood and readily carried into effect, the invention will now be described with reference to the accompanying drawings, in which:

Figure 1 illustrates an example of the present invention in accordance with the first of the above-mentioned forms, and Figure 2 illustrates an example of the invention in accordance with the second of the above-mentioned forms.

Referring to Figure 1 references $1_a$ and $1_b$ indicate different portions on a single shaft 1 which is driven by a servo-motor (not shown) in such a way that the angular displacement of the shaft from a given datum position represents the displacement of a target which is being tracked by radar or other tracking means. The scale of the apparatus is such that each half-revolution of the shaft represents, say, a displacement of 12,500 feet, assuming the parameters indicated above. It will of course be understood that this scale is given merely by way of example and that other range scales may be adopted. The apparatus comprises three main units and one of them, located within the dotted outline 2, consists of means for setting up a representation of the instantaneous position of the target. The second unit is enclosed within the dotted outline 3 and comprises means for storing a signal representing part of each of a series of positions represented by the unit 2. The third unit comprises means for deriving a rate signal and this is represented merely by the block 30.

The unit 2 comprises an inductive potentiometer (or autotransformer) 4 which is energised by a reference alternating voltage of fixed amplitude from a source represented conventionally by 5. A series of equi-spaced taps on the potentiometer 4 are connected alternately to two series of contact studs $a_1, a_2 \ldots a_n$ and $b_1, b_2 \ldots b_n$. The series of studs $a_1$ to $a_n$ is arranged to be scanned by a contact brush 6 and the series of studs $b_1$ to $b_n$ is similarly arranged to be scanned by a contact brush 7.

In practice the studs in each series are arranged in a circle and the brushes 6 and 7 are mounted on a shaft, and the studs are shown arranged in straight lines merely for convenience of illustration. Moreover the brushes 6 and 7 are of the break-before-make type and they are mounted on their shaft, which is symbollised in the drawing by the dotted line 8 so that backlash is provided between the brushes and the shaft, the extent of the backlash representing 12,500 feet on the scale of the shaft. The backlash is symbollised by the arrows 9 and 10. The angular distance between the mid-point of a stud in one series and the mid-point of the adjacent stud in the next series represents the target displacement of 12,500 feet, and the shaft 8 is geared to the shaft 1 by gears represented symbolically by the dotted rectangle $1_c$ so that it rotates at the appropriate speed. In the drawing it is assumed that the target is just crossing the boundary between two 12,500 feet zones represented by the studs $a_4$ and $b_4$ respectively, the crossing of such a boundary being represented by each half revolution of the shaft 1. The leading edge of the brush 7 is just contacting one edge of the stud $b_4$ whereas the brush 6 is in alignment with stud $a_4$. The two brushes 6 and 7 therefore remain in contact with the same studs $a_4$ and $b_4$ during the next half-revolution of the shaft 1 and the correspondingly geared down displacement of the shaft 8, assuming that the shaft continues to rotate in the same direction. Furthermore even if the shaft 8 should start to reverse at the position indicated both brushes 6 and 7 would still remain in contact with the studs $a_4$ and $b_4$ for a displacement representing 12,500 feet, by reason of the backlash in the drive. Therefore whereas the shaft 8 indicates the present position of the target on a coarse scale in which one unit represents 12,500 feet, one brush indicates the zone in which the target is located, and the other always indicates the zone from which the target has moved. Moreover one of the brushes picks up an E.M.F. representing the present zone, whereas the other brush picks up a E.M.F.'s representing the zone from which the target has moved. Instead of providing brushes with a large overhang as indicated, they may be moved intermittently in steps of 12,500 feet by means of an impulse motor.

Assume for example that the shaft 8 has been rotating in the sense representing an increasing displacement, so that the brushes 6 and 7 have been moving upwards, as seen in the drawing. Correspondingly the brushes 24 and 25 have been rotating in an anti-clockwise sense. At the instant indicated in the drawing, the brush 24 has just come on to the series of studs $d_1, d_2 \ldots d_n$, whilst the brush 25 is just leaving this series of studs. The brushes 7 and 24 have therefore just moved into the position to provide the output to the terminal 29. However, assume that the observed displacement begins to diminish at the instant represented. Due to backlash on the shaft 8, no movement of the brushes 6 and 7 occurs until the displacement diminishes by 12,500 feet, but the shaft $1_a, 1_b$ reverses instantly. The brush 24 moves off the series of studs $d_1, d_2 \ldots d_n$ and the brush 25 moves back round this series of studs, so that the brushes 6 and 25 resume the function of providing the output to the terminal 29. Therefore the position of the brushes 24 and 25 and also that of the brush 32, indicates which of the brushes 6 and 7 is providing a coarse indication of the present position of the target. In particular when the brush 32 co-operates with the semicircle of studs $g_1$ to $g_n$ the brush 6 provides the coarse indication of the present position of the target, and conversely when the brush 32 co-operates with the semicircle of studs $g'_1$ to $g'_n$ the brush 7 provides the coarse indication of the present position of the target.

The electro-motive forces picked up by the brushes 6 and 7 are applied by conductors 22 and 23 to two further brushes 24 and 25 which are also mounted on the shaft 1. The brushes 24 and 25 are arranged to scan alternately a series of contact studs $d_1, d_2 \ldots d_n$ arranged in an arc as indicated. These studs are connected to taps on an interpolating inductive potentiometer 27 which is energised, by a voltage whose amplitude is a fixed fraction of a reference voltage from 5, by virtue of a secondary winding 28 inductively coupled to the potentiometer 4. An electro-motive force representing the present position of the target (on a more finely divided scale than represented by the studs $a_1$ to $a_n$ and $b_1$ to $b_n$) is set up at an output terminal 29 tapped to the mid-point of the potentiometer 27. This electro-motive force is the sum of the electro-motive force on one of the conductors 22 and 23 and the electro-motive force induced between corresponding brush 24 or 25 and the mid-point of the potentiometer 27. During the times of changeover between zones, both the brushes 24 and 25 are in engagement with the studs $d_1$ to $d_n$ to avoid discontinuities. The brushes 24 and 25 are arranged to be of the make-before-break type, also to avoid discontinuity. The output delivered to the terminal 29 may undergo further stages of interpolation if desired so as to set up a representation of the present position of the target to any desired degree of accuracy. Such further interpolating means are not shown since they are not directly concerned with the present invention.

The unit 3 has means for storing a part of each of a series of 10 successive positions represented by the unit 2 of the apparatus. Since the storage means for each of the ten signals may be identical only one is shown and it is moreover substantially of the construction described in United States patent specification No. 2,882,524. It comprises a series of toroidal cores $e_1 \ldots e_n$ each representing a binary digital place, and an additional core $e_{n+1}$. The series $e_1$ to $e_n$ comprises as many cores as are required to represent displacements of up to 12,500 feet to a degree of subdivision sufficient to give a desired accuracy. Two series of conductors $f_1, f_2 \ldots f_n$ and $f_1'$, $f_2' \ldots f_n'$, connected at one end to a common earth point 31 and are laced selectively through or past the cores $e_1$ to $e_n$ so that the conductors in each series represent different numbers expressed in a binary code. The drawing is based on the assumption that the conventional binary code is used, but in practice the cyclic permutation binary code is preferable, as described in the last-mentioned application. If a given conductor corresponds to a binary number in which any one digit has value 1 the conductor is laced through the respective core whereas if the digit has value zero the conductor passes outside the respective core. It will be seen for example that the conductors $f_1$ and $f_3$ pass outside the core $e_1$ whereas the conductors $f_2$ and $f_4$ pass through the core $e_1$ and so on, the core $e_1$ representing the lowest order digit. The conductors in each of the series $f_1$ to $f_n$ or $f_1'$ to $f_n'$ represent successive displacements in the range 0 to 12,500 feet, the numbers represented by the corresponding conductors in both series being the same. At their ungrounded ends conductors $f_1$ to $f_n$ are connected respectively to a series of studs $g_1$ to $g_n$ whereas the conductors $f_1'$ to $f_n'$ are connected to a series of studs $g_1'$ to $g_n'$. The two series of studs form a stud circle scanned by a brush 32 mounted on shaft 1 and the brush 32 has an input terminal 33 to which sampling pulses can be applied at predetermined times. The conductors laced through the toroidal cores can be regarded as a single turn primary winding and each of the cores has a secondary winding denoted symbolically by the references $h_1 \ldots h_{n+1}$. When voltages are picked up by the secondary windings (as will appear subsequently) these voltages are applied to a series of relays $j_1 \ldots j_n, j_{n+1}$. The relays $j_1$ to $j_n$ operate a system of switches $k_1 \ldots k_n$ which control a corresponding series of transformer secondary windings $l_1$ to $l_n$. The numbers of turns in the successive secondary windings represent successive binary digits, the section $l_2$ having twice the number of turns of the section $l_1$ and so on. These windings are wound on a common core 34 having an energising winding 35 to which is applied a reference alternating voltage $35_a$ of fixed amplitude.

In the operation of the storage means as so far described, a sampling pulse is applied to the brush 32 at say, the first second of successive intervals of 10 seconds. Depending on the displacement of the brush 32 at the time of the pulse, the pulse is transmitted via the cores $e_1$ to $e_n$ selectively to the relays $j_1$ to $j_n$ and sets the switches $k_1$ to $k_n$ in a combination of states which is a binary representation of the displacement of the brush within each semi-circle, that is each zone of 12,500 feet. The switches in turn selectively connect the transformer sections $l_1$ to $l_n$ in the series chain between the points 36 and 37 so that an E.M.F. is induced across the series chain from the winding 35 having an amplitude which is the voltage analogue of the displacement expressed by the condition of the switches. The voltage analogue thus set up by the windings $l_1$ to $l_n$ is "frozen" or stored until a subsequent sampling pulse changes the states of the relays, whereupon the previously stored analogue is automatically cleared and replaced by the analogue of the new position of the brush.

If the cyclic permutation binary code is used the switches $k_1$ to $k_n$ may be of the construction described in United States patent specification No. 2,882,524, so as to achieve the changeover from binary code to analogue voltage directly.

The core $e_{n+1}$ plays no part in the storage of the voltage analogue, its function being to derive from the unit 2 a signal which is added to the stored analogue. It will be observed that one of the series of conductors $f_1$ to $f_n$ is laced through the core $e_{n+1}$ whereas the other series of conductors passes outside this core. Therefore if a sampling pulse is applied to the brush 32 when it is traversing one stud series $g_1'$ to $g_n'$, the relay $j_{n+1}$ is so conditioned as to move a switch $k_{n+1}$ to the condition shown. This connects the conductors 23 via conductor 39 to the point 36 so that there is added to the stored analogue the E.M.F. which is picked off by the brush 7 from the potentiometer 4. Similarly, if the sampling pulse is applied when the brush 32 is traversing the stud series $g_1$ to $g_n$, the point 36 is connected by conductor 40 to the conductor 22. In either case an E.M.F. is added to the stored analogue and representing the zone in which the target was located at the time of storage and when it is added to the stored analogue the resultant voltage which is set up between ground and the point 37 is representative of the full displacement of the target. Moreover the construction of the apparatus is such that, for all anticipated movements of the target, the brush 7 remains in contact with the same stud in the series $b_1$ to $b_n$ throughout the interval through which the stored voltage may be required for rate evaluation, say a maximum interval of 10 seconds. Therefore the rate evaluation can be effected without risk of ambiguity, though only part of successive positions of the target are stored. The winding $l_n$ is connected in the reverse sense from the other windings $l_1$ to $l_{n-1}$ to take account of the fact that the mid-point of each stud $a_1$ to $a_n$ and $b_1$ to $b_n$ is the centre of a zone.

The voltage set up at the point 37 is applied to the means for deriving a rate signal 30. This is represented by the arrow $m_1$ and the arrows $m_2 \ldots m_n$ represent the application of further signals to generator 30 each composed of stored analogues representing the contribution of minor digits to which is added a signal derived from the unit 2 representing the contribution of major digits. Each of the leads $m_1$ to $m_n$ therefore carries the output of an individual series of transformer windings like $l_1$ to $l_n$. Moreover each such series of transformer windings has an individual series of switches like $k_1$ to $k_{n+1}$ and a series of relays like $j_n$ to $j_{n+1}$. The toroidal cores $e_1$ to $e_{n+1}$ may however be common to all the series of relays, provided that switch means are provided operated in synchronism with the sampling pulses applied at 33 so that as successive sampling are applied, the successive outputs from the toroids are switched in cyclic order to the different series of relays. As aforesaid sampling occurs at intervals of one second. Therefore a sampling pulse is applied to terminal 33 every second and in operation, a signal representing the target displacement at a given time is applied to the generator 30 by connection $m_1$ a signal representing the target displacement a second later is applied by the connection $m_2$, a signal representing the target displacement another second later is applied by $m_3$ and so on in cyclic order. The means for generating the rate signal may be of any suitable construction but the invention is especially applicable to arrangements in which the rate signal generator is of the construction described in United States patent specification No. 2,887,270. Reference 41 represents an output terminal from which the rate signal is derived.

Summarising the apparatus illustrated in Figure 1, the components within the dotted outline 2 can be regarded as means for observing values of displacement at sucessive instants of time whilst the components within the rectangle 3 constitute means for storing, during a predetermined interval of time, a part-representation of each of a number of observed values. Each part-representation is a representation of the lower order digits, these lower digits being those required to express the fractional part of the displacement on a course scale on which unity represents 12,500 feet. However, as the part-representations would, by themselves, give rise to errors in the rate evaluation, since they would not take account of changes in the value of the next higher digit, means are provided for each store for modifying the stored part-representations so that the modified part-representations differ one from another by the same amounts as the respective observed values expressed in full. The modifying means is in the form of two brushes 6 and 7 which derive first and second singals on the conductors 22 and 23, which signals are variable in discrete steps to represent changes in value in the said next higher digit. The shaft 8 selectively varies the first and second signals when changes in the said next higher digit occur in the observed values of the displacement, backlash in the coupling between the shaft 8 and the brushes 6 and 7 being predetermined to cause one signal on the conductors 22 and 23 to lag behind the other by a unit step. Furthermore the switch 36 and its associated relay and the connections thereto constitute means for selectively adding signals on the conductors 22 and 23 to the part-representations which are stored in the means 3. There is of course a switch 36 for each of the ten part-representations which can be stored at any one time, the contacts of all switches 36 being simultaneously connected to the conductors 39 and 40 and thence to the conductors 22 and 23.

Referring to Figure 2, there is again illustrated part of a store for storing representations of a displacement of a target and constructed in accordance with Figure 2 of United States patent specification No. 2,882,524. Corresponding parts in Figures 1 and 2 are denoted by the same references. The store comprises a transformer primary winding 35 to which is applied a reference alternating voltage of fixed amplitude. Associated with the winding 35 is a system of secondary windings $l_1, l_2 \ldots l_n$, $l_{n+1}$ which in turn are associated with a system of switches $k_1, k_2 \ldots k_n, k_{n+1}$. As described with reference to Figure 1 and also in the last-mentioned specification, when the target displacement is sampled, the switches $k_1, k_2 \ldots k_n, k_{n+1}$ are set by means of relays $j_1, j_2 \ldots j_n$, $j_{n+1}$ in a combination of states which is a binary representation of the observed value of the displacement. The switches then connect a combination of the windings $l_1, l_2 \ldots l_n$ in series between the output terminal 37 and ground at point 36, and the number of turns on the windings are related to one another as successive powers of two in such a way that the alternating voltage which can be derived at the output terminal has an amplitude which is dependent on the observed value of the displacement. As in the case of Figure 1 the number of windings $l_1$ to $l_n$ is sufficient to represent displacements up to 12,500 feet, whereas the winding $l_{n+1}$ corresponds to an additional digit of next highest order and a signal is added from $l_{n+1}$ to the analogue stored by $l_1$ to $l_n$ whose value is dependent on the present position of the target. The method of operating the relays in response to an interrogating pulse is the same as in Figure 1, although in Figure 2 the switches shown are of the kind which may be used when the cyclic permutation binary code is employed.

The winding $l_{n+1}$ of the storage means is associated with two switches 42 and 43 and as indicated in the drawing these switches have one condition in which the winding $l_{n+1}$ has the same sense as all the other windings, $l_1$ to $l_n$, and a second condition in which the connections to the winding $l_{n+1}$ are reversed. Therefore in the first condition of the swiches 42 and 43 (assuming $k_{n+1}$ is the alternate condition to that illustrated) the voltage induced in the winding $l_{n+1}$ adds to the output voltage derived from 37 whilst in the other condition of the switches the voltage across $l_{n+1}$ subtracts from the output voltage at 37. The switches 42 and 43 are not controlled by the relays which control the switch $k_1$ to $k_{n+1}$ but are controlled by a relay 44 which has one end connected to a voltage source of 20 volts and its other end connected to a contact brush 45. The relay has, moreover, a held switch 46 connected between the brush 45 and a resistor 47 which is returned to ground. The brush 45 is driven by a shaft 48 of a servo-motor 49 which is sensitive to the target displacement. It will be understood that the servo-motor 49 will in any case form part of the displacement sensing and rate measuring apparatus. The brush 45 is arranged to scan a system of contacts $c_0$, $c_1 \ldots c_n$. These contacts are alternately connected to ground and a voltage source of 20 volts, the even-numbered contacts $c_0, c_2 \ldots$ being connected to the voltage source and the odd-numbered contacts $c_1, c_3 \ldots$ being connected to ground. The contacts are equi-distant from each other and the separation between any two contacts is arranged to represent, on the scale of the brush 45, a displacement of the target by 12,500 feet. The brush 45 therefore corresponds to the brushes 6 and 7 in Figure 1 and constitutes means for representing the present position of the target on a coarse scale in which one unit represents 12,500 feet thereby dividing the total range of the equipment into sections separated by imaginary boundaries at 12,500 feet intervals. The brush 45 is represented in the drawing as being displaced along a straight line but in practice would be rotatable and the contacts $c_0, c_1, c_2 \ldots$ would be correspondingly arranged. The shaft 48 is preferably arranged to have a scale value of 25,000 feet per revolution, or a small multiple of this and if the shaft has a scale of 25,000 feet per revolution a single contact would suffice for all the even-numbered contacts $c_0, c_2 \ldots$ and similarly a single contact would suffice for all the odd-numbered contacts.

The voltage set up at 37 is applied as in Figure 1 to the rate signal generator 30, the voltage being one of series of say ten voltages which are applied in a cyclic order to the generator 30. In this case the other voltages of the series are set up by storage means similar to that shown, and the rate signal generator may be of the construction described in United States patent specification No. 2,887,270.

In the drawing, the relay 44 is indicated as controlling the switches 42 and 43 in only one storage means but it will be understood that the same relay is arranged to control in a similar manner all the storage means which are present in the apparatus.

In operation of the arrangement shown, each time the brush 45 engages one of the odd-numbered contacts $c_1$, $c_3 \ldots$ the relay 44 is energized and closes the hold switch 46 and moves the reversing switches 42 and 43 into the position shown by the dotted lines. When the hold switch 46 is closed the current flowing through the resistor 47 and relay winding maintains the relay 44 energized. When the brush 45 engages one of the contacts $c_0$, $c_1$ ... the relay 44 is momentarily de-energized, the hold switch is opened and the reversing switches 42 and 43 are moved to the position shown in full lines. Therefore as the target crosses successive boundaries in the full range of the apparatus each of the stores is modified so that the rate signal can be evaluated by a simple differencing process without ambiguity. When the winding $l_{n+1}$ is connected between ground and 37 it injects a voltage whose amplitude is the analogue of 12,500 and the sign of which depends upon the present position of the target. The timing of the operation of the relay 44 is indicated to the left of Figure 2, assuming movement of the brush 45 in the direction indicated.

Let it be assumed for example, that each displacement observed in a series of ten observations is within the zone 0 to 12,500 feet and that the target is travelling positively, that is to say the displacement is increasing. In this zone the additional digit has the value 0 and rate measurement can be effected by the observed values of the displacement without ambiguity. Subsequent observations of the target reveal displacements in the zone 12,500 feet to 25,000 feet and stored signals representing such displacements include an additional digit of value 1 to which a positive value is assigned, so that even if values on both sides of the 12,500 feet boundary are simultaneously stored and used for the rate evaluation there is no ambiguity. However, as soon as the target crosses the 25,000 feet boundary it is arranged that the additional digit for each displacement on the positive side of the boundary (that is greater than 25,000 feet) has the value 0 for the highest order digit. Moreover, as soon as a displacement occurs on the positive side of this boundary all the stored representations of displacement on the negative side of the boundary (that is below 25,000 feet) are modified so as to treat the additional digit as negative. For example, assume that one stored displacement is 21,875 feet. The digital code signal which is stored to represent this displacement represents 111 ... and as long as there is no stored signal representing a displacement greater than 25,000 feet, the storage means in which this signal is stored is arranged to synthesise the signal as 12,500+6,250+3,125 feet, that is indicative of a positive displacement with reference to the 12,500 feet boundary. However, as soon as a displacement beyond the 25,000 feet boundary is observed, the storage means are modified to measure displacements in the zone from 12,500 to 25,000 feet as negative with reference to the latter boundary. The aforesaid signal representing 111 ... is then evaluated as $$-12{,}500+6{,}250+3{,}125=-3{,}125$$

On crossing the 25,000 feet boundary, the storage means for all other displacements on the negative side of the boundary are similarly modified. Only one boundary can be crossed in any interval of 10 seconds. When all displacements are in the zone between 25,000 and 37,500 feet, the additional digit is zero in all cases, so that on crossing the 37,500 feet boundary, the additional digit can again be assigned a positive value and the storage means conditioned accordingly. However, as soon as a displacement exceeding 50,000 feet is observed, measurements are made with reference to this boundary and the storage means are again conditioned to give a negative significance to the additional digit, representing displacements below 50,000 feet. Similar changes occur at each succeeding boundary, the boundaries being located at intervals of 12,500 feet. If the target is moving in a negative direction, that is to say with decreasing displacement, similar changes in the significance of the additional digit occur and consequently no discontinuity occurs on passing any boundary. The interaction of the brush 45 and the studs $c_0$, $c_1$, $c_2$ provides the electrical equivalent of the mechanical backlash provided in Figure 1.

In the ideal case, the contacts $c_0$, $c_1$, $c_2$ ... should be extremely short so that the sign changeover is made just before the boundary is reached in each case but in practice a finite length of contact, as well as being necessary for mechanical reasons, is helpful in allowing sufficient time for the operation of the relays.

If the servo-mechanism provided for the displacement sensing and rate evaluation apparatus does not have a shaft which can be employed as the shaft 48 the sign reversals may alternatively be initiated by means of the relays $k_1$ to $k_{n+1}$. On observing the state of the relay $k_{n+1}$ and also the next two lower relays as the target moves across successive boundaries the following digital pattern is perceived:

| | Sign of additional digit |
|---|---|
| 000 | − |
| 111 | |
| 110 | |
| 101 | |
| 100 | + |
| 011 | |
| 010 | |
| 001 | |
| 000 | − |
| 111 | |
| 110 | |

It is apparent that if a change of sign to positive is required as a boundary is approached the lower two digits are identical but different from the additional digit whilst if a change of sign to negative is required all three digits are the same. Appropriate interconnections of the relays $k_{n+1}$, $k_n$ and $k_{n-1}$ in all the storage means can be arranged to express this condition and initiate movement of the reversing switches 42 and 43 in each store. In this modification of the invention use can also be made of still lower digits and the use of more digits to bring about the sign change has the advantage that the sign change can be delayed until nearer the boundary. However, in the case envisaged above storage relays are changed only once per second and therefore the last digit which can be allowed to influence the sign reversals is the last one through which the value of the displacement can move in one second. For this reason the arrangement shown in the drawing is preferred.

What I claim is:

1. Apparatus for evaluating the rate of change of one variable with respect to a second variable comprising means for observing values of the first variable at successive values of the second variable, a plurality of stores for storing a plurality of part-representations of observed values of the first variable, each during a predetermined interval of time corresponding to a predetermined interval of the second variable, each part-representation being a representation of lower order digits of the respective observed values, means responsive to said observing means for selectively modifying the stored part-representations to cause them to differ by the same amounts as the respective observed values of the first variable, and means responsive to the selectively modified part-representations for generating a signal representing the desired rate of change.

2. Apparatus for evaluating the rate of change of one variable with respect to a second variable comprising means for observing values of the first variable at successive values of the second variable, a plurality of stores for storing a plurality of part-representations of observed values of the first variable, each during a predetermined interval of time corresponding to a predetermined interval of the second variable, each part-representation being a representation of lower order digits of the respective observed value and said lower order digits being predetermined so that the next higher digit may only change its value by unity during said interval of the second variable, means responsive to said observing device for selectively modifying the stored part-representations to cause them to differ by the same amounts as the respective observed values of the first variable, and means responsive to the selectively modified part-representations for generating a signal representing the desired rate of change, said modifying means comprising means for deriving first and second discretely variable signals variable in discrete steps to represent changes in the value of said next higher digit and lagging one behind the other by one step, means for selectively varying said discretely variable signals in response to said observing means when changes in said next higher digit occur, and means for selectively adding said discretely variable signals to said stored part-representations.

3. Apparatus for evaluating the rate of change of one variable with respect to a second variable comprising means for observing values of the first variable at successive values of the second variable, a plurality of stores for storing a plurality of part-representations of observed values of the first variable, each during a predetermined interval of time corresponding to a predetermined interval of the second variable, each part-representation being a representation of lower order digits of the respective observed value and said lower order digits being predetermined so that the next higher digit may only change its value by unity during said interval of the second variable, means responsive to said observing device for selectively modifying the stored part-representations to cause them to differ by the same amounts as the respective observed values of the first variable, and means responsive to the selectively modified part-representations for generating a signal representing the desired rate of change, said modifying means comprising means for deriving for each part-representation a modifying signal representing the magnitude of said next digit in the respective value of the first variable, and means for selectively adding or subtracting said modifying signal from the respective part-representations in response to said observing means.

4. Apparatus for evaluating the rate of change of one variable with respect to a second variable comprising means for observing successive values of the first variable at successive values of the second variable, a plurality of binary signal stores for storing a plurality of part-representations of observed values of the first variable, each during a predetermined interval of time corresponding to a predetermined interval of the second variable, each of said stores comprising a series of transformer windings the numbers of turns of which are representative of successive binary digits, means for selectively connecting said windings in a series chain, and means for exciting said windings with a predetermined flux variation, each stored part-representation being a representation of lower order digits of the respective observed value, means responsive to said observing means for selectively modifying the stored part-representations to cause them to differ by the same amount as the respective observed values of the first variable, and means responsive to the selectively modified part-representations for generating a signal representing the desired rate of change.

5. Apparatus according to claim 2, said means for deriving said discretely variable signals comprising a potentiometer, a series of studs tapped to said potentiometer, the spacing of said studs representing unit change of said next higher digit, first contact means arranged to scan alternate studs of said series, second contact means arranged to scan intervening studs of said series, and means for displacing said contact means in response to said observing means, said displacing means having backlash to an extent representing unit change of said next higher digit.

6. Apparatus according to claim 4, said lower order digits of an observed value being pre-determined so that the next higher digit may only change its value by unity during said interval of the second variable, and said modifying means comprising additional transformer winding for each series of windings and having a number of turns representing unit value of said next higher digit, means for selectively connecting said additional winding in said series chain including a switch means responsive to said observing means for selecting the sense of said additional winding with respect to said first mentioned windings to add or subtract to a stored part-representation a signal representing the magnitude of said next higher digit.

References Cited in the file of this patent

UNITED STATES PATENTS

| | | |
|---|---|---|
| 2,190,497 | Whitby et al. | Feb. 13, 1940 |
| 2,658,670 | Morton | Nov. 10, 1953 |